3,099,673
PROCESS FOR THE PRODUCTION OF ORGANIC ISOCYANATES
Engelbert Kühle, Cologne-Stammheim, Germany, assignor to Farbenfabriken Bayer Aktiengesellschaft, Leverkusen, Germany, a corportion of Germany
No Drawing. Filed Aug. 10, 1960, Ser. No. 48,574
Claims priority, application Germany Aug. 19, 1959
4 Claims. (Cl. 260—453)

This invention relates to the preparation of organic isocyanates and more particularly to the preparation of aliphatic monoisocyanates and aliphatic polyisocyanates.

It has been heretofore known to produce aliphatic and cycloaliphatic monovalent and divalent isocyanates by a two-step process which comprises first the conversion of N-alkyl formamides into the corresponding N-chloroalkyl formamides with tertitary alkyl hypochlorites and then converting the N-chloroalkyl formamides in the presence of a tertiary amine into the corresponding isocyanates. The following equation illustrates this prior art method:

$$R-NHCHO + t.C_4H_9OCl \longrightarrow$$

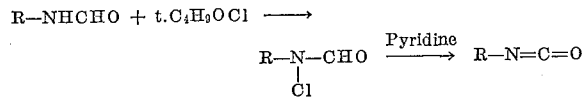

where R is an aliphatic radical.

This two-stage process results in yields of about 75 to 95 percent in the first stage of the reaction and from about 50 to about 75 percent in the second step of the reaction depending upon the starting materials employed. This process which employs tertiary alkyl hypochlorites and tertiary bases such as pyridine is disadvantageous for the reason that both of these materials must be subsequently removed from the reaction material after the isocyanate product is formed. The removal of these two components is rather difficult in that separation techniques must be followed.

It is, therefore, an object of this invention to provide an improved method of making organic isocyanates. It is another object of this invention to provide an improved process for preparing aliphatic isocyanates. It is still another object of this invention to provide an improved method of making organic isocyanates from N-aliphatic formamides. It is a further object of this invention to provide an improved method of making organic isocyanates from N-aliphatic formamides which method does not require difficult extraction techniques for removing the final product from the reaction mixture.

The foregoing objects and others which will become apparent from the following description are accomplished in accordance with the invention, generally speaking, by providing a method for preparing N-aliphatic isocyanates and polyisocyanates by reacting N-aliphatic formamides with free halogen in accordance with the following equation:

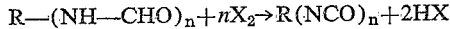

$$R-(NH-CHO)_n + nX_2 \rightarrow R(NCO)_n + 2HX$$

wherein R is an aliphatic radical, X is halogen and n is an integer of 1, 2, 3 or 4 depending on the valence of R. Of course, the formamides can also be reacted with compounds which split off free halogens. In either event, the free halogen reacts with the formamide.

The aliphatic radical of the above formamide may be any suitable aliphatic radical such as, for example, alkyl, alkenyl, alkylidene, alkenylidene, alkylene, alicyclic, substituted alkyl, alkenyl and alicyclic, aralkyl and the like. It is, of course, understood that where polyvalent isocyanates are to be made, the aliphatic radical will have the appropirate number of formamide groups attached thereto as indicated from the formula by $n$. Any suitable alkyl radical may be used such as, for example, methyl, ethyl, propyl, butyl, isopropyl, isobutyl, tertiary butyl, amyl, dodecyl and the like. Any suitable alkenyl radical may be used such as, for example, ethenyl, propenyl, butenyl and the like. Any suitable alicyclic radical may be used such as, for example, cyclobutyl, cyclopentyl, cyclohexyl, cycloheptyl, cyclohexenyl, cyclopentadienyl, cyclohexylene and the like. The aliphatic radical of the above formamide may be selected from the group consisting of saturated aliphatic hydrocarbon radicals, ethylenically unsaturated hydrocarbon radicals, halogen substituted saturated aliphatic radicals, halogen substituted ethylenically unsaturated aliphatic radicals, nitro substituted saturated aliphatic radicals, nitro substituted ethylenically unsaturated aliphatic radicals, alkoxy substituted saturated aliphatic radicals, alkoxy substituted ethylenically unsaturated aliphatic radicals, alkyl substituted phenyl radicals and halogen substituted phenyl radicals. Of course, any of the previously mentioned aliphatic radicals may be substituted in one or more positions with different radicals such as, halogen, nitro alkoxy and the like. Any suitable aralkyl radical such as, for example, benzyl, phenyl ethyl, chlorophenyl methyl, phenyl propyl, phenyl butenyl xylylene and the like may be used.

Specific formyl compounds suitable in the process of this invention for the preparation of isocyanates include N-methyl formamide, N-propyl formamide, N-tertiary butyl formamide, N-dodecyl formamide, N-cyclohexyl formamide, N-benzyl formamide, N-(β-phenyl ethyl)-formamide, N-(β-chloroethyl)-formamide, N-(3-methoxy propyl)-formamide, N-ethenyl formamide, N-allyl formamide, N-cyclohexenyl formamide and the like. Of course, diisocyanates nad polyisocyanates may be prepared from compounds where the aliphatic radical contains more than one formamide group for example, diisocyanates may be prepared from the bis-formyl compounds of primary diamines such as, for example, 1,4-tetramethylene diamine, 1,6-hexamethylene diamine, cyclohexane-1,4-diamine, xylylene diamine and the like.

In carrying out the process in accordance with this invention either elemental halogens themselves such as chlorine and bromine may be reacted directly with the formyl compounds or agents which split off free halogen such as, for example, sulphuryl chloride or phosphorous pentachloride may be reacted with the formyl compounds. In either event, of course, the elemental halogen causes the reaction to take place and enters into the reaction by the formation of the isocyanate and the liberation of two mols of hydrogen for each mol of isocyanate formed.

In carrying out the process in accordance with the invention, the N-alkyl formamide can be dissolved or suspended in an organic solvent such as, for example, carbon tetrachloride, chloroform, o-dichlorobenzene and the like and the halogen or a reactant which splits off free halogen is introduced. The temperature of the reaction mixture is maintained at about room temperature and preferably at a temperature of from about 20° C. to about 50° C.

Generally, a temperature of about 100° C. should not be exceeded. The presence of a solvent in which the N-alkyl formamides are dissolved or suspended is not a necessary requirement for the practice of this invention. The N-alkyl formamides can also be reacted in the absence of solvents. In either of these procedures, however, the isocyanate is isolated from the reaction mixture in the usual manner known in the art which in most cases is only a simple distillation step.

When the starting N-alkyl formamide is either methyl, ethyl or propyl, the corresponding N-alkyl carbamic acid chlorides as well as the corresponding isocyanates are obtained due to the isocyanate partially combining in a reversible manner in the cold state with the hydrogen halide which is liberated during the distillation. In these cases, the carbamic acid chlorides may be converted in the manner known in the art to the isocyanate such as by a phosgenation step.

The products of this invention find utility as intermediates for the production of various final products. The monovalent isocyanates are particularly useful as intermediates in the production of plant protecting agents and in medicines. The polyvalent isocyanates find utility in the plastics industry for the preparation of urethane plastics by the isocyanate-polyaddition process. The polyurethane plastics are suitable for the preparation of cellular and elastomeric products. The cellular products find advantageous use in the furniture industry for cushions, pillows and the like and in the automotive industry for crash pads, arm rests and the like. The elastomeric products are suitable as motor mounts, shaft couplings, gears and the like.

The invention is further illustrated by the following examples in which parts are given by weight unless otherwise specified.

Example 1

About 135 grams of sulphuryl chloride are introduced dropwise at room temperature over a period of about 1 hour into a solution of about 59 grams of N-methyl-formamide in about 150 ml. of o-dichlorobenzene, and provision is made by cooling with water for the temperature not to exceed about 30° C. Stirring is continued for a few hours and the reaction solution consisting of two layers is distilled while stirring at atmospheric pressure. About 63 grams of a mixture of methyl isocyanate and methyl carbamic acid chloride with a B.P. of 90–91° C. are thus obtained.

Example 2

About 80 grams of bromine are mixed dropwise at room temperature with about 30 grams of N-methyl-formamide. After stirring for several hours, the solution is distilled in vacuo. After obtaining first runnings for a short time, there are obtained about 50 grams of a mixture of methyl isocyanate and N-methyl-carbamic acid bromide having a $B.P._{21}$ of 30–31° C.

Example 3

While cooling with water, about 67.5 grams of sulphuryl chloride are introduced dropwise into 60 grams of N-n-butyl formamide. As a result, the temperature rises to about 45° C. Heating takes place for about 30 minutes on a water bath until the evolution of $SO_2$ and HCl has ended and thereafter distillation is carried out at atmospheric pressure, whereby there are obtained about 21 grams=42% of the theoretical of N-n-butyl-isocyanate having a B.P. of 112–114° C.

Example 4

About 90 grams of N-benzyl-formamide are introduced at room temperature into a solution of about 90 grams of sulphuryl chloride and about 300 ml. of thionyl chloride. The reaction mixture is stirred for several hours and distilled in vacuo after removing the solvent. There are obtained about 63 grams=71% of the theoretical of benzyl isocyanate having a $B.P._{14}$ of 96–100° C.

Example 5

About 37 grams of hexahydroformanilide are introduced dropwise at a temperature below about 30° C. into about 60 ml. of sulphuryl chloride. After stirring for about 3 hours, the excess sulphuryl chloride is distilled off and the residue is fractionated in vacuo. About 26 grams=72% of the theoretical of cyclohexylisocyanate having a $B.P._{14}$ of 55–56° C. distill over.

Example 6

About 72 grams of the bis-formyl compound of tetramethylene diamine are introduced slowly into about 150 cc. of sulphuryl chloride at a temperature below about 20° C. A small degree of heat of reaction is found with gradual liquefaction. After a short time, the solution crystallizes again. About 400 ml. of toluol are added, the excess sulphuryl chloride is distilled off and the substance is heated for a period of time on a water bath. The toluene solution is decanted off from the insoluble resin and concentrated in vacuo. After distilling off the solvent, there are obtained 20 grams=29% of the theoretical of tetramethylene diisocynate having a $B.P._{15}$ of 108–110° C.

Example 7

About 58.5 grams (half mol) of N-3-methoxypropyl)-formamide are introduced dropwise at room temperature into about 80 ml. of sulphuryl chloride. By cooling, it is ensured that the temperature does not exceed about 30° C. Stirring is continued for a time after all the N-3-methoxypropyl)-formamide has been added. The excess sulphuryl chloride is distilled off and thereafter fractionated in vacuo. About 42 grams=73% of the theoretical of 3-methoxypropyl isocyanate distill over ($B.P._{20}$ of 54–55° C.)

Of course, it is understood that any of the aliphatic formamide compounds set forth above may be utilized in the working examples for the preparation of the corresponding isocyanate. Also any halogen or compound which splits off a halogen may be used in reaction with the formamide compounds to prepare the corresponding isocyanate as illustrated in the working examples.

Although the invention has been described in considerable detail for the purpose of illustration, it is to be understood that variations may be made therein by those skilled in the art without departing from the spirit of the invention and the scope of the claims.

What is claimed is:

1. A process for the production of an aliphatic isocyanate having the formula $$R-(NCO)_n$$

which comprises:

reacting a N-aliphatic formamide with a halogen to form said aliphatic isocyanate, said halogen selected from the group consisting of chlorine and bromine, said N-aliphatic formamide having the general formula $$R-(NH-CHO)_n$$

wherein R has a valence of 1 to 4 and is selected from the group consisting of saturated aliphatic hydrocarbon radicals, ethylenically unsaturated aliphatic hydrocarbon radicals, halogen substituted saturated aliphatic hydrocarbon radicals, halogen substituted ethylenically unsaturated aliphatic hydrocarbon radicals, nitro substituted saturated aliphatic hydrocarbon radicals, nitro substituted ethylenically unsaturated aliphatic hydrocarbon radicals, alkoxy substituted saturated aliphatic hydrocarbon radicals, alkoxy substituted ethylenically unsaturated aliphatic hydrocarbon radicals, alkyl substituted phenyl radicals, and halogen substituted phenyl radicals, and wherein $n$ is an integer equal to the valence of R.

2. The process of claim 1 wherein said N-aliphatic formamide is reacted with said halogen at a temperature up to about 100° C.

3. The process of claim 1 wherein said N-aliphatic formamide is reacted with said halogen at a temperature of from about 20° C. to about 50° C.

4. The process of claim 1 wherein said aliphatic formamide is reacted while in an inert solvent, and wherein the reaction porduct of said halogen and said formamide is distilled to obtain the desired isocyanate.

References Cited in the file of this patent

UNITED STATES PATENTS

| | | |
|---|---|---|
| 2,640,846 | Hurwitz | June 2, 1953 |
| 2,860,166 | Newcomer et al. | Nov. 11, 1958 |

OTHER REFERENCES

Degering: "Organic Nitrogen Compounds," 1945 Edition, p. 544 (one page), University Lithoprinters.

Sanders et al.: "Chemical Reviews," vol. 43, 1947, page 205 (one page).

(Copies of above in Division 38.)

Gould: "Mechanism and Structure in Organic Chemistry," pp. 621–2 (1959). (Copy in Library.)